US00RE42136E

(19) United States
(12) Reissued Patent
Blyth et al.

(10) Patent Number: US RE42,136 E
(45) Date of Reissued Patent: Feb. 15, 2011

(54) CLEANING COMPOSITION COMPRISING A BRANCHED ESTER AND AN ORGANIC SOLUTE

(75) Inventors: Judith Helen Blyth, Auckland (NZ); Fadil Al-Alawi, North Shore (NZ)

(73) Assignee: Brilliance Intellectual Property Limited, Auckland (NL)

(21) Appl. No.: 12/685,562

(22) PCT Filed: May 30, 2005

(86) PCT No.: PCT/NZ2005/000106

§ 371 (c)(1),
(2), (4) Date: Dec. 11, 2006

(87) PCT Pub. No.: WO2005/023750

PCT Pub. Date: Mar. 17, 2005

Related U.S. Patent Documents

Reissue of:
(64) Patent No.: 7,533,677
Issued: May 19, 2009
Appl. No.: 11/570,384
Filed: Dec. 11, 2006

(30) Foreign Application Priority Data

Jun. 10, 2004 (NZ) ..... 533453

(51) Int. Cl.
*B08B 3/04* (2006.01)
*C11D 3/20* (2006.01)
*C11D 3/43* (2006.01)
*C11D 3/50* (2006.01)

(52) U.S. Cl. ..... 134/25.2; 134/38; 134/39; 134/41; 134/42; 510/101; 510/245; 510/267; 510/437; 510/505

(58) Field of Classification Search ..... 134/25.2, 134/38, 39, 41, 42; 510/101, 245, 267, 437, 510/505
See application file for complete search history.

(56) References Cited

U.S. PATENT DOCUMENTS

| | | | | | |
|---|---|---|---|---|---|
| 5,179,128 | A | * | 1/1993 | Lyle et al. | 510/136 |
| 5,421,907 | A | * | 6/1995 | Nieendick et al. | 134/40 |
| 5,604,193 | A | * | 2/1997 | Vlasblom | 510/212 |
| 5,676,763 | A | * | 10/1997 | Salisbury et al. | 134/22.12 |
| 5,750,750 | A | * | 5/1998 | Duncan et al. | 554/117 |
| 2004/0072703 | A1 | * | 4/2004 | Burgo et al. | 508/463 |
| 2005/0070192 | A1 | * | 3/2005 | Lorenzotti et al. | 442/327 |
| 2006/0039956 | A1 | * | 2/2006 | Hensen et al. | 424/443 |
| 2006/0048091 | A1 | * | 3/2006 | Joshi et al. | 716/21 |

FOREIGN PATENT DOCUMENTS

| | | | |
|---|---|---|---|
| DE | 102 39 647 | * | 3/2004 |
| EP | 0 761 843 | * | 3/1997 |
| JP | 4-66689 | * | 3/1992 |
| JP | 8-231991 | * | 9/1996 |
| JP | 2003-277788 | * | 10/2003 |
| WO | WO 90/03419 | * | 4/1990 |
| WO | WO 94/24253 | * | 10/1994 |
| WO | WO 95/14753 | * | 6/1995 |
| WO | WO 95/35411 | * | 12/1995 |
| WO | WO 00/37597 | * | 6/2000 |
| WO | WO 03/37293 | * | 5/2003 |
| WO | WO 2004/024110 | * | 3/2004 |
| WO | WO 2005/023750 | * | 3/2005 |

* cited by examiner

*Primary Examiner*—Brian P Mruk
(74) *Attorney, Agent, or Firm*—Young & Thompson

(57) ABSTRACT

A cleaning composition which may be a stainless steel cleaning composition comprising a branched ester and an organic solute. The use and a method of using the cleaning composition is also included within the scope of the present invention.

21 Claims, No Drawings

CLEANING COMPOSITION COMPRISING A BRANCHED ESTER AND AN ORGANIC SOLUTE

Matter enclosed in heavy brackets [ ] appears in the original patent but forms no part of this reissue specification; matter printed in italics indicates the additions made by reissue.

FIELD OF THE INVENTION

This invention relates to a cleaning composition, in particular, but not exclusively to a cleaning composition for use on stainless steel, in addition, the invention also relates to various methods of applying the cleaning composition to the surface of a material.

BACKGROUND OF THE INVENTION

There is a domestic and industrial need to be able to clean or remove grease, stains or dirt from materials such as a ceramics and metals, and thus restore the lustre of these materials.

Although the present invention is embodied in several different aspects, it is clear from this extremely broad background review, that each of these aspects are so linked as to form part of the same inventive concept.

OBJECT

It is therefore an object of the present invention to go at least some way towards providing a solution to the aforementioned need in a simple yet effective manner or to at least provide the public with a useful choice.

STATEMENTS OF THE INVENTION

According to one aspect of the present invention, there is provided a cleaning composition comprising a branched ester and an organic solute.

Accordingly in a second aspect of the present invention there is provided a stainless steel cleaning composition comprising an ester of a branched fatty acid with a fatty alcohol.

Preferably, the stainless steel cleaning composition farther comprises a solute. Although the branched ester may be derived from a branched alcohol and a linear fatty acid, preferably the branched ester is derived from a branched fatty acid and a number of fatty alcohols.

For the avoidance of doubt, the term "derived from" in this context is intended to include readily available or made precursors to the branched ester for example, the acid may be the acid halide.

Preferably the or each fatty alcohol is a linear chain alcohol having a carbon chain length in the range of 5-25. This is particularly advantageous as the lypophillic chain will associate itself with grease and many other types of organic material on the surface to be cleaned, making it easier to clean.

More preferably the or each fatty alcohol has a carbon chain length selected from or in the range of 15-19.

Even more preferably, the fatty alcohol is derived from the group comprising coconut oil, palm kernel oil and whale oil.

Preferably, the branched fatty acid contains carbon containing branches in the range of 1-5.

More preferably, there are three carbon containing branches.

More preferably, the branches contain the same number of carbon atoms.

Preferably, the total number of carbon atoms in any molecule of the branched fatty acid is in the range of 6-12.

More preferably, the range is 7-9.

Preferably the branched ester is cetearyl (or cetostearyl) isonanoate.

Preferably the composition comprises cetearyl isononanoate in the range of 90-99% w/w.

More preferably the composition comprises cetearyl isononanoate in the range of 98% w/w.

Even more preferably the cleaning composition comprises cetearyl isononanoate in the range of 97.8% w/w.

Preferably the cleaning composition comprises an organic solute in the range of 1-10% w/w.

More preferably the cleaning composition comprises an organic solute that is substantially 2% w/w.

Preferably the organic solute comprises an oil expressed from lemon peel.

Preferably the organic solute is D-Limonene.

Preferably the cleaning composition further comprises an additional organic preservative.

More preferably the preservative comprises 0.2% w/w of glydant dissolved in solvent mixture.

Even more preferably the glydant may be selected from the group comprising 1,3-Dihydroxymethyl 5,5-dimethylhydantoin; 1-Hydroxymethyl-5,5-dimethylhydantoin; 5,5-Dimethylhydantoin; 3-Iodo-2-propynl butyl carbamate and 1,3-butylene glycol.

Preferably, the organic solvent is formaldehyde and water.

Accordingly in a third aspect the present invention there is provided a use of a branched ester and organic solvent for the manufacture of a cleaning composition for cleaning stainless steel. Preferably the branched ester is derived from a branched fatty acid and a number of fatty alcohols.

Preferably the or each fatty alcohol is a linear chain alcohol having a carbon chain length in the range of 5-25.

More preferably the or each fatty alcohol has a carbon chain length selected from or in the range of 15-19.

Even more preferably, the fatty alcohol is derived from the group comprising coconut oil, palm kernel oil and whale oil.

Preferably, the branched fatty acid contains carbon containing branches in the range of 1-5.

More preferably, there are three carbon containing branches.

More preferably, the branches contain the same number of carbon atoms.

Preferably, the total number of carbon atoms in any molecule of the branched fatty acid is in the range of 6-12.

More preferably, the range is 7-9.

Preferably the branched ester is cetearyl (or cetostearyl) isonanoate.

Even more preferably, the cetearyl (or cetostearyl) isonanoate is in the form of a product known commercially by the Trade Mark Cetiol SN.

Preferably the composition comprises cetearyl isononanoate in the range of 90-99% w/w.

More preferably the composition comprises cetearyl isononanoate in the range of 98% w/w.

Even more preferably the cleaning composition comprises cetearyl isononanoate in the range of 97.8% w/w.

Preferably the cleaning composition comprises an organic solute in the range of 1-10% w/w.

More preferably the cleaning composition comprises an organic solute that is substantially 2% w/w.

Preferably, the organic solute comprises an oil expressed from a citrus fruit.

Preferably the organic solute comprises an oil expressed from lemon peel.

Preferably the organic solute is D-Limonene.

Preferably the cleaning composition further comprises an additional organic preservative.

More preferably the preservative comprises 0.2% w/w of glydant dissolved in solvent mixture.

Even more preferably the glydant may be selected from the group comprising 1,3-Dihydroxymethyl 5,5-diimethylhydantoin; 1-Hydroxymethyl 5,5-dimethylhydantoin; 5,5-Dimethylhydantoin; 3-Iodo-2-propynl butyl carbamate and 1,3-butylene glycol.

Preferably, the organic solvent is formaldehyde and water.

The amount w/w of the or each glydant may be selected from the range 1-70% of the glydant and solvent mixture combination.

Preferably, 3-Iodo-2-propynl butyl carbamate is used in the range of 1.8-2.7% w/w.

Preferably, 1,3-butylene glycol is used in the range 3.3-4.9% w/w.

Preferably, the formaldehyde is used in the range of 0.15-0.25% w/w.

Preferably, the water is used in the range 20-25% w/w.

Accordingly in a further aspect of the present invention there is provided a stainless steel wipe comprising a flexible substrate impregnated with the composition according to the first statement of the invention.

Preferably, in the range of 5-60% of the surface area of one or both of the substrate surfaces is impacted with the composition, More preferably, this range is 30-50%.

Accordingly in a still further aspect the invention consists in a method of cleaning a surface of a material employing a composition as described herein comprising the steps of:

applying the composition to the surface, applying pressure and friction substantially firmly to the cleaning composition against the surface, and removing the cleaning composition from the surface.

Preferably, the cleaning composition is contained within a compressed gas container and applied to the surface by actuating a nozzle on the container.

Preferably, the cleaning composition is impregnated onto a cloth or wipe, thus allowing the first two steps of the method as outlined above to be combined.

The invention may also broadly be said to consist in the parts, elements and features referred to or indicated in the specification of the application, individually or collectively, and any or all combinations of any two or more of the parts, elements or features and where specific integers are mentioned herein which have known equivalents such equivalents are deemed to be incorporated herein as if individually set forth.

The invention consists of the foregoing an also envisages constructions of which the following gives examples.

DESCRIPTION OF THE PREFFERED EMBODIMENTS

The present invention comprises a cleaning composition suitable for cleaning a stainless steel surface.

The first cleaning composition comprises cetearyl isononanoate in the form of Cetiol SN mixed together with an organic solvent in the form of a range of some of the natural oils of lemon peel. The cleaning composition thus formed is especially effective in removing stains and/or grease and/or smears and/or any contaminants on the surface, particularly when the surface is a metallic shiny one.

The organic solute, D-Limonene is a yellow oil with a characteristic lemon taste and odour and even though it is present in a small amount, it serves as a cleaning agent in its own right, and it also acts as an anti smearing agent. It also provides the composition with a fragrance.

Even though this cleaning composition comprises substantially the solute in the range of 1 and 10% w/w, it was found that substantially 2% w/w of the organic solute tends to give the most satisfactory results. The formulation is given in Example 1.

The formulation of the second preferred embodiment is given in Example 2 and the reader will see that it includes a glydant composition formed from multiple components in equal weight for weight.

The details of the preservative can be found in Table 3.

Example 1

A preferred formulation for the cleaning composition of the present invention is as follows: substantially 98% w/w of Cetiol SN and substantially 2% w/w of D-Limonene.

Example 2

Another preferred formulation for the cleaning composition of the present invention is as follows: substantially 97.8% w/w of Cetiol SN; substantially 2% w/w of D-Limonene and 70% total w/w (for the glydant and solvent mixture) in any combination of 1,3-Dihydroxymethyl 5,5-dimethylhydantoin; 1-Hydroxymethyl-X,X-dimethylhydantoin and 5,5-Dimethylhydantoin; whilst 3-Iodo-2-propynl butyl carbamate is 2.5% w/w (of the glydant solvent mixture) and 1,3-butylene glycol is 4.5% w/w (of the glydant solvent mixture), and the formaldehyde is 0.19% w/w (of the glydant solvent mixture) and the water is makes up the remainder of the w/w %.

Example 3

Another preferred formulation for the cleaning composition of the present invention is as follows: substantially 98.5% w/w Cetiol SN and 1.5% w/w perfume in the form of grean lemon 4852.

Other examples employed during the research stages included

Example 4

Mineral oil (Finavestan A80B) as substantially 98.5% w/w and 1.5% w/w perfume in the form of grean lemon 4852 &

Example 5

Mineral oil (Finavestan A80B) as substantially 98% w/w and 2% w/w D-Limonene.

The cleaning composition is best prepared by a method which includes the steps of mixing and dissolving the organic solute D Limonene in Cetiol SN.

This is performed by placing the Cetiol SN into a clean dry mixing vessel, and adding the D-Limonene drop wise followed by the glydant dissolved in the glydant solvent mixture in a similar manner.

Once the D-limonene and the glydant dissolved in the glydant solvent mixture has been dissolved, the mixture is ready for bottling.

The method of restoring the lustre to a metal surface that has been contaminated comprises the steps of applying the cleaning composition to the surface, applying pressure and friction with a rag, tissue or cloth firmly over the surface containing the cleaning composition and subsequently removing the cleaning composition from the surface.

The preferred cleaning composition of the present invention works particularly well in restoring the lustre of metallic surfaces such as stainless steels and chrome, however either embodiment of the cleaning composition may also clean other smooth surfaces like porcelain copper, other metals, metal alloys and even fluorinated objects having surfaces that are known commercially by the Registered Trade Mark "Teflon".

Users will also find the cleaning composition effective when applied on the surface of cutlery, sinks, wash hand basins and bathtubs. It should be noted that the cleaning composition is biodegradable.

Either of the embodiments of the cleaning composition of the present invention may be contained in a compressed gas container thus allowing the cleaning composition to be sprayed onto a surface to achieve an even distribution.

Alternatively, the cleaning composition can be impregnated onto a cloth or wipe, the cloth or wipe possibly containing a removable surface sheet to expose a "ready to use" cloth or wipe.

Advantages

It can be seen that at least in the preferred form of the invention a cleaning composition is provided which offers the following advantages:

1. efficient removal of grease, stains or marks, notably soap scum and marks from showers and shower heads, ceramics, and glass although in the latter case the amount of composition applied to a wipe or substrate is in the range of 5-15%.

2. effective restoration of the lustre or shininess of a surface 3. simple and easy to use and manufacture 4. giving a pleasant smell of a citrus fruit, preferably lemon.

Throughout the description and claims of this specification the word "comprise" and variations of that word, such as "comprises" and "comprising", are not intended to exclude other additives, components, integers or steps.

The invention claimed is:

1. A cleaning composition comprising:

(a) a branched ester chosen from cetearyl isononanoate or cetostearyl isononanoate; and (b) an organic solute, wherein said cleaning composition is impregnated on a flexible substrate to form a cleaning wipe suitable for cleaning metal and/or ceramic and for cleaning the surface of cutlery, sinks, and wash basins for food preparation.

2. A method of cleaning a surface of a material, said method comprising:

applying the cleaning composition of claim 1 to the surface, applying pressure and friction firmly to the cleaning composition against the surface, and removing the cleaning composition from the surface, wherein said method is suitable for cleaning the surface of cutlery, sinks, and wash basins for food preparation.

3. The cleaning composition of claim 1, wherein the cleaning composition contains cetearyl isononanoate in a range of 90-99% w/w.

4. The cleaning composition of claim 1, wherein the solute is lemon oil in a range of 1-10% w/w.

5. The cleaning composition of claim 4, wherein the lemon oil is present at substantially 2% w/w of the cleaning composition.

6. The cleaning composition of claim 4, wherein the lemon oil is d-Limonene.

7. The cleaning composition of claim 1, wherein the wipe has two surfaces and 5-60% of the surface area of one or both of the surfaces is impacted with the cleaning composition.

8. The cleaning composition of claim 1, further comprising a preservative.

9. The cleaning composition of claim 8, wherein the preservative comprises 0.2% w/w of glydant dissolved in a solvent mixture.

10. The cleaning composition of claim 9, wherein the preservative is selected from the group consisting of: 1,3-dihydroxymethyl 5,5 dimethylhydantoin; 1-hydroxymethyl-5,5-dimethylhydantoin; 5,5-dimethylhydantoin; 3-Iodo-2-propynl butyl carbamate and 1,3-butylene glycol.

11. The cleaning composition of claim 1, which further contains formaldehyde together with water.

12. A cleaning wipe suitable for cleaning metal and/or ceramic, said cleaning wipe comprising a flexible substrate impregnated with a cleaning composition, wherein said cleaning composition comprises an effective amount of:

(a) a branched ester chosen from cetearyl isononanoate or cetostearyl isononanoate; and (b) an organic solute, and wherein said cleaning wipe is suitable for cleaning the surface of cutlery, sinks, and wash basins for food preparation.

13. The cleaning wipe of claim 12, wherein the composition contains cetearyl isononanoate in a range of 90-99% w/w.

14. The cleaning wipe of claim 12, wherein the composition also contains lemon oil in a range of 1-10% w/w.

15. The cleaning wipe of claim 14, wherein the lemon oil is present at substantially 2% w/w of the cleaning composition.

16. The cleaning wipe of claim 14, wherein the lemon oil is d-Limonene.

17. The cleaning wipe of claim 12, wherein the wipe has two surfaces and 5-60% of the surface area of one or both of the surfaces is impacted with the cleaning composition.

18. The cleaning wipe of claim 12, further comprising a preservative.

19. The cleaning wipe of claim 18, wherein the preservative comprises 0.2% w/w of glydant dissolved in a solvent mixture.

20. The cleaning wipe of claim 19, wherein the preservative is selected from the group consisting of: 1,3-dihydroxymethyl 5,5 dimethylhydantoin; 1-hydroxymethyl-5,5-dimethylhydantoin; 5,5-dimethylhydantoin; 3-Iodo-2-propynl butyl carbamate and 1,3-butylene glycol.

21. The cleaning wipe suitable of claim 12, wherein the cleaning composition further contains formaldehyde together with water.

* * * * *

UNITED STATES PATENT AND TRADEMARK OFFICE

CERTIFICATE OF CORRECTION

PATENT NO. : RE42,136 E
APPLICATION NO. : 12/685562
DATED : February 15, 2011
INVENTOR(S) : Judith Helen Blyth and Fadil Al-Alawi It is certified that error appears in the above-identified patent and that said Letters Patent is hereby corrected as shown below:

On the Title Page:

Item "(73) Assignee: Brilliance Intellectual Property Limited, Auckland (NL)"

should read:

Item --(73) Assignee: Brilliance Intellectual Property Limited, Auckland (NZ)--.

Signed and Sealed this
Ninth Day of August, 2011

David J. Kappos

David J. Kappos
*Director of the United States Patent and Trademark Office*